(12) United States Patent
Swett et al.

(10) Patent No.: US 12,436,075 B2
(45) Date of Patent: Oct. 7, 2025

(54) FAST ADMITTANCE MEASUREMENT METHOD FOR PIEZOELECTRIC LEAF CELL SENSOR ARRAY IN MULTIPHASE GAS-OIL-WATER FLOW METERING

(71) Applicant: ARAMCO SERVICES COMPANY, Houston, TX (US)

(72) Inventors: Dwight W. Swett, Houston, TX (US); Robert Adams, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 255 days.

(21) Appl. No.: 18/321,320

(22) Filed: May 22, 2023

(65) Prior Publication Data
US 2024/0393218 A1    Nov. 28, 2024

(51) Int. Cl.
*G01N 9/00* (2006.01)

(52) U.S. Cl.
CPC .................... *G01N 9/002* (2013.01)

(58) Field of Classification Search
CPC ...................................... G01N 9/002
See application file for complete search history.

(56) References Cited

U.S. PATENT DOCUMENTS

| | | | |
|---|---|---|---|
| 4,240,285 A | 12/1980 | Langdon | |
| 7,994,932 B2 | 8/2011 | Huang et al. | |
| 9,173,600 B2 | 11/2015 | Matsiev et al. | |
| 10,018,034 B2 | 7/2018 | Chronister | |
| 11,035,771 B2 | 6/2021 | Niedermayer | |

(Continued)

FOREIGN PATENT DOCUMENTS

| | | |
|---|---|---|
| WO | 2018017558 A1 | 1/2018 |
| WO | 2018/089869 A1 | 5/2018 |
| WO | 2020128512 A1 | 6/2020 |

OTHER PUBLICATIONS

Munir Farasat et al., "A new method for wideband characterization of resonator-based sensing platforms", Review of Scienctific Instruments, Mar. 29, 2011, vol. 82, No. 3, pp. 035119.1-035119.8 (8 pages).

(Continued)

*Primary Examiner* — John E Breene
*Assistant Examiner* — Alex T Devito
(74) *Attorney, Agent, or Firm* — Osha Bergman Watanabe & Burton LLP

(57) ABSTRACT

An apparatus for fluid measurement is disclosed. The apparatus includes a leaf cell sensor having one or more piezoelectric radial components connected to a circumferential component, a first electrode positioned on a distal face of at least one radial component, a second electrode positioned on a proximal face of the at least one radial component, a voltage source having a negative terminal and a positive terminal, the negative terminal being connected to the first electrode and the positive terminal being connected to the second electrode, an electric current measurement device connected to the first and second electrode to measure current flowing between the first and second electrode, and a processor of a computing device that determines, from the measured current, one or more properties of the fluid, where the voltage source couples electrical energy into the one or more piezoelectric radial components at multiple frequencies concurrently.

17 Claims, 12 Drawing Sheets

(56) References Cited

U.S. PATENT DOCUMENTS

| | | | |
|---|---|---|---|
| 11,066,930 | B2 | 7/2021 | Swett et al. |
| 11,428,100 | B2 | 8/2022 | Swett et al. |
| 11,536,679 | B2 | 12/2022 | Swett |
| 2002/0093348 | A1 | 7/2002 | Buhler et al. |
| 2003/0183383 | A1 | 10/2003 | Guerrero |
| 2014/0367092 | A1 | 12/2014 | Roberson et al. |
| 2016/0326866 | A1 | 11/2016 | Swett |
| 2018/0003027 | A1 | 1/2018 | Donzier et al. |
| 2018/0110913 | A1 | 4/2018 | Loderer et al. |
| 2019/0023589 | A1 | 1/2019 | Norman et al. |
| 2020/0355071 | A1 | 11/2020 | Maity |
| 2020/0355073 | A1 | 11/2020 | Maity et al. |
| 2021/0131990 | A1 | 5/2021 | Swett |
| 2021/0318219 | A1* | 10/2021 | Rutgers .................... G01N 9/04 |

OTHER PUBLICATIONS

International Search Report and Written Opinion issued in International Application No. PCT/US2024/029431, dated Sep. 5, 2024 (14 pages).

International Search Report issued for corresponding international patent application No. PCT/US2024/051896, mailed Jan. 27, 2025 (6 pages).

Written Opinion issued for corresponding international patent application No. PCT/US2024/051896, mailed Jan. 27, 2025 (11 pages).

D. Swett, "Experimental Characterization of a Piezoelectric Leaf-Cell Sensor for Simultaneous Fluid Density and Sound Speed Measurement," IEEE Sensors Letters, pp. 1-4, 2020 (4 pages).

P. Moon and D. E. Spencer, Field Theory Handbook, Berlin: Springer-Verlag, 1988 (244 pages).

J. Hoja and G. Lentka, "Fast Impedance Spectroscopy Method using Square Pulse Excitation," in 12th IMEKO TC1 & TC7 Joint Symposium on Man Science & Measurement, Annecy, 2008 (6 pages).

S. Sun, L. Xu, Z. Cao, H. Zhou and W. Yang, "A high-speed electrical impedance measurement circuit based on Information-filtering demodulation," Measurement Science and Technology, vol. 25, p. 075010, 2014 (11 pages).

S. Majzoub, A. Allagui and A. S. Elwakil, "Fast Spectral Impedance Measurement Method Using a Structured Random Excitation," IEEE Sensors Journal, vol. 20, No. 15, p. 8637, 2020 (7 pages).

J. Sihvo, D.-I. Stroe, T. Messo and T. Roinila, "A Fast Approach for battery Impedance Identification Using Pseudo Random Sequence (PRS) Signals," IEEE Transactions on Power Electronics, vol. 35, No. 3, pp. 2548-2557, 2020 (12 pages).

Chaudhuri, Anirban et al., "An Algorithm for Determining Volume Fractions in Two-Phase Liquid Flows by Measuring Sound Speed"; Journal of Fluids Engineering; vol. 134, Issue 10; Article 101301; pp. 101301-1-101301-7; Oct. 2012 (7 pages).

Kuster, Guy T. et al., "Velocity and Attenuation of Seismic Waves in Two-Phase Media: Part I. Theoretical Formulations"; Geophysics; vol. 39, Issue 5; pp. 587-606; Oct. 1974 (20 pages).

Meng, Guangtian et al., "Composition measurements of crude oil and process water emulsions using thick-film ultrasonic transducers"; Chemical Engineering and Processing: Process Intensification; vol. 45, Issue 5; pp. 383-391; May 2006 (9 pages).

Tsouris, Costas et al., "Volume Fraction Measurements of Water in Oil by an Ultrasonic Technique"; Industrial & Engineering Chemistry Research; vol. 32, Issue 5; pp. 998-1002; May 1, 1993 (5 pages).

Urick, R. J., "A Sound Velocity Method for Determining the Compressibility of Finely Divided Substances"; Journal of Applied Physics; vol. 18, Issue 11; pp. 983-987; Nov. 1947 (5 pages).

Roshani, Gholam Hossein et al., "Volume fraction determination of the annular three-phase flow of gas-oil-water using adaptive neuro-fuzzy inference system"; Computational and Applied Mathematics; vol. 37, Issue 4; pp. 4321-4341; Sep. 2018 (21 pages).

Ramos, Robson et al., "Volume Fraction Calculation in Multiphase System Such as Oil-Water-Gas Using Neutron"; Proceedings of the 2007 International Nuclear Atlanic Conference—INAC 2007; Aug. 29-Oct. 5, 2007 (8 pages).

Wood, A. B., "A Textbook of Sound"; Being an account of the Physics of Vibrations with special reference to recent theoretical and technical developments; pp. v-574; 1946 (590 pages).

Swett, Dwight et al., "Multiphase Flow Analysis Using Piezoelectric Leaf-Cell Sensor Array"; IEEE Sensors Letters; vol. 6, Issue 10, Article Sequence No. 2501104; Oct. 2022 (4 pages).

Nejad, A. Rabani et al., "Improving the Measurement of vol. Fraction of Multiphase Fluids Based on Attenuation of Gamma Rays Without the Use of Artificial Intelligence"; MAPAN-Journal of Metrology Society of India; vol. 36, Issue 4; pp. 869-874; Dec. 2021 (6 pages).

Salgado, Cesar Marques et al., "Three-phase flow meters based on X-rays and artificial neural network to measure the flow compositions"; Flow Measurement and Instrumentation; vol. 82, Article 102075; pp. 1-7; Dec. 2021 (7 pages).

First Examination Report issued in corresponding Saudi Arabian Application No. 522432468; dated Oct. 28, 2020 (9 pages).

* cited by examiner

FAST ADMITTANCE MEASUREMENT METHOD FOR PIEZOELECTRIC LEAF CELL SENSOR ARRAY IN MULTIPHASE GAS-OIL-WATER FLOW METERING

BACKGROUND

Generally, fluids in the petrochemical industry, for example, fluids in a wellbore of an oil field, may be single or multiphase fluids. Wellbore fluids may include mixtures of miscible and immiscible fluids, for example, mixtures of oil and water. Wellbore fluids may include mixtures of liquid and gas, liquid and solid, gas and solid, or mixtures of liquid, gas, and solid. Environmental conditions in a wellbore and in fluid systems associated with the extraction and transport of hydrocarbons may vary significantly. For example, temperatures in a wellbore may vary from approximately 2° C. to over 130° C. Pressures may vary from atmospheric pressure to over 50 Megapascals (MPa) at the bottom of an oil well. Composition of a wellbore fluid and environmental conditions in a wellbore greatly affect the rheological properties of a fluid. Analysis of rheological properties in situ may be important to ensure proper handling of fluids in a wellbore and related fluid systems. For example, if a wellbore fluid exhibits a viscosity above a certain threshold value, mitigating measures may need to be taken to maximize the degree of fluid extraction. Such measures include thermal methods (for example, hot fluid circulation), pressure management (for example, pumping or boosting), or chemical treatments. Because these measures may be costly, accurate determination of wellbore fluid properties is critical.

SUMMARY

In general, in one aspect, the invention relates to an apparatus for fluid measurement. The apparatus includes a leaf cell sensor having one or more piezoelectric radial components connected to a circumferential component, the one or more radial components and the circumferential component having a distal face and a proximal face, a first electrode positioned on the distal face of at least one radial component, a second electrode positioned on the proximal face of the at least one radial component, a voltage source having a negative terminal and a positive terminal, the negative terminal being connected to the first electrode and the positive terminal being connected to the second electrode, an electric current measurement device connected to the first and second electrode to measure current flowing between the first and second electrode, and a processor of a computing device and a non-transitory computer readable medium storing instructions thereon, wherein the instructions, when executed, cause the processor to determine, from the measured current, one or more properties of the fluid, wherein the voltage source couples electrical energy into the one or more piezoelectric radial components at multiple frequencies concurrently.

All or parts of the methods, systems, and techniques described in this specification may be implemented as a computer program product. The computer program product may include instructions that are stored on one or more non-transitory machine-readable storage media. The instructions may be executable on more or more processing devices. The example apparatus or example methods may be used with a multiphase fluid. The example apparatus or example methods may be used with a wellbore fluid.

Any two or more of the features described in this specification, including in this summary section, may be combined to form implementations not specifically described in this specification.

The details of one or more implementations are set forth in the accompanying drawings and the description. Other features and advantages will be apparent from the description and drawings, and from the claims.

BRIEF DESCRIPTION OF THE DRAWINGS

Specific embodiments of the disclosed technology will now be described in detail with reference to the accompanying figures. Like elements in the various figures are denoted by like reference numerals for consistency.

DETAILED DESCRIPTION

Figure 1:
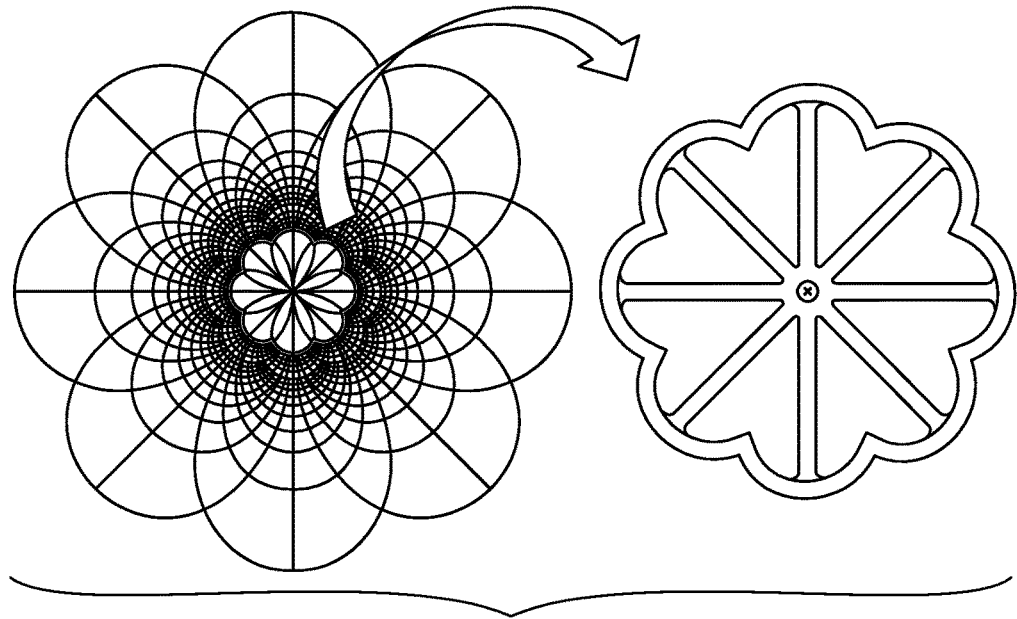
FIG. 1 shows a graphical representation of a Rhodonea cell resonator geometry based on conformal mapping contours in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Measurement of one or more rheological properties of a fluid may allow determination of other properties, for example, the composition of the fluid. Acoustic measurements can be used for determining composition and chemical properties of unknown fluids, for example, multi-phase fluids, and may be applied to fluid identification (ID) problems in a variety of sensor development fields. Without wishing to be bound by theory, certain chemometric correlations may exist between downhole multi-phase fluid properties and bulk fluid acoustic properties, for example, of sound speed and density. Example downhole multi-phase fluid properties include volume fractions, gas-oil-ratio (GOR), American Petroleum Institute oil gravity (API) (where API gravity=141.5/SG-131.5, where SG is the specific gravity of crude oil), live-oil density, and live-oil compressibility. This specification describes an example resonant cell geometry sensor that provides real-time bulk fluid acoustic properties measurements that may be part of a system and methods for multi-phase fluid decomposition analysis.

To measure rheological properties of a fluid, for example, wellbore fluid, two separate sensors may be deployed at different locations to acquire two measurements comprising, for example, fluid density and sound speed. Measurement algorithms for some single-mode sound speed sensors may be applied that estimate multi-phase fluid properties, such as volume fraction of continuous and dispersed phases. These algorithms, however, rely on a priori knowledge of the mass density of both the continuous and dispersed phase of a fluid flow as inputs to the estimation. Due to the constraints of this a priori density property requirement, these single-mode sensors may be used primarily for surface systems that are used in the oil and gas industry where these types of data are readily available. These types of sensor approaches may not be applicable to in-situ downhole fluid identification applications. Analysis of multi-phase fluid composition may require a simultaneous and congruent measurement of two (or more) fluid properties, that is, at the same instant and from the same identical set of particles comprising the fluid domain. Example sensors described in this specification may retrieve fluid property measurements, for example, of both continuous and dispersed phase, simultaneously and congruently, forming a basis for in situ and real-time multi-phase compositional analysis.

An example resonator sensor as described in this specification may provide simultaneous and congruent measurement of acoustic properties that may allow in situ downhole discrimination of bulk fluid properties, for example, mass density and sound speed. An example fluid may be a multi-phase fluid. An example fluid may include oil, water, gas, drilling fluid, or a combination of two or more of oil, water, gas, and drilling fluid. An example resonator sensor implementation may use the dynamic acoustic behavior of a dilatational fluid volume brought into resonance by electromechanical means to form an algorithm that relates feedback coupling between the resonating fluid volume and the electromechanical device to infer acoustic properties of the fluid. The dilatational resonance of the fluid volume may be formed intrinsically by curvilinear Rhodonea contours of a leaf-type cell piezoelectric structure acting on a subdomain of a fluid that flows through the cell structure to create an intrinsic Helmholtz cavity response, for example, using only the leaf cell and the fluid.

FIG. 1 shows a graphical representation of an example Rhodonea cell resonator geometry based on conformal mapping contours. The geometry for an example leaf cell resonator element may be based on contour segments of the canonical Rhodonea conformal mapping geometry defined by the mathematical relations:

$$x = \pm \frac{1}{\rho}\sqrt{\rho + u} \qquad \text{Eq. (1)}$$

$$y = \pm \frac{1}{\rho}\sqrt{\rho - u} \qquad \text{Eq. (2)}$$

$$\rho = \sqrt{u^2 + v^2} \qquad \text{Eq. (3)}$$

Where 'u' and 'v' are the are the Rhodonea conformal domain coordinates as illustrated in the constant coordinate 'x'/'y' plot of FIG. 1, and ρ designates a variable function of the two mapping variables 'u' and 'v'. The conformal contour segments form an eight-fold symmetry in the leaf cell resonator geometry and are joined by eight central spoke members.

Figure 2:
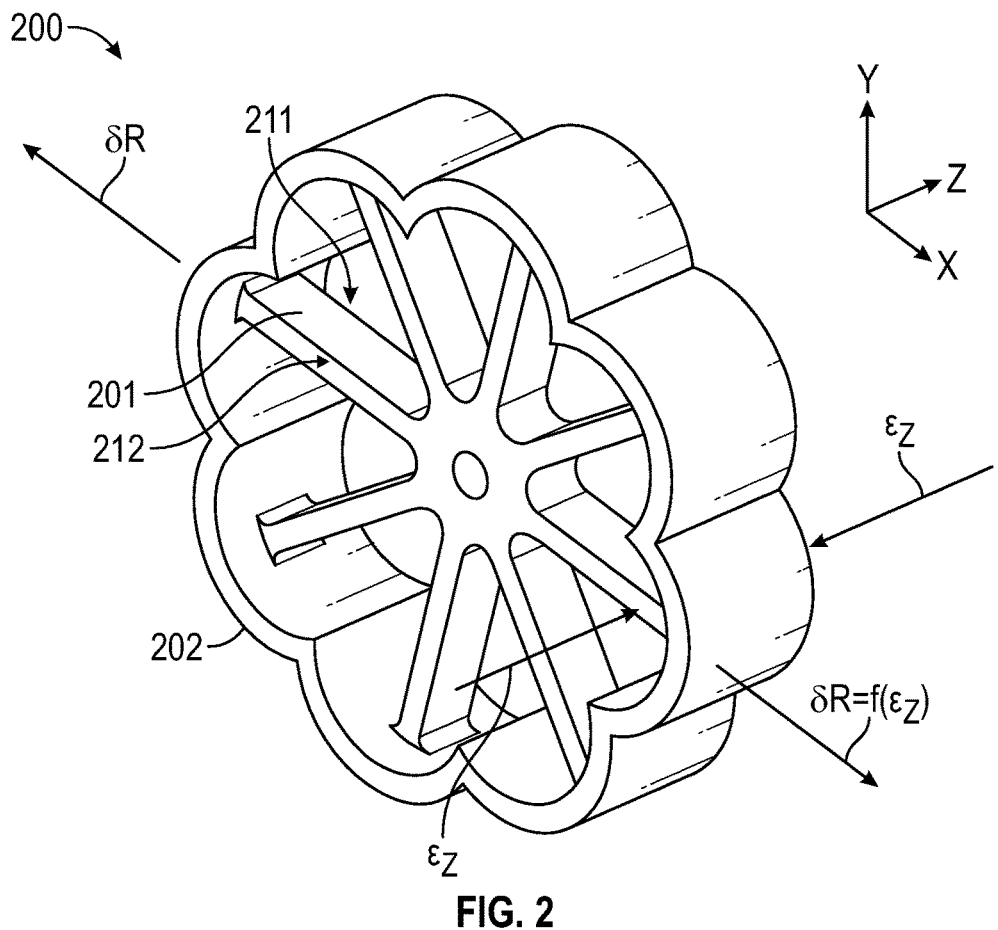
FIG. 2 shows a perspective view of an example leaf cell in accordance with one or more embodiments.

An example leaf cell (200) is shown in FIG. 2. In some implementations, a leaf resonator is excited by applying an electrical voltage potential across electrically conductive electrode surfaces placed on the top and bottom faces (for example, proximal face (211) and distal face (212) of one or more central spoke members (201) as illustrated in FIG. 2. The applied voltage creates a through-thickness mechanical strain (strain along the Z-axis, $\varepsilon_z$) in each spoke member due to the piezoelectricity of the leaf cell material. As a consequence of the Poisson's ratio effect (the negative of the ratio of transverse strain to axial strain), this through-thickness strain creates a corresponding longitudinal strain in each spoke member (201) in the radial direction (X-Y plane, δR) that results in symmetrical dilatation of the leaf cell resonator (202). Resonance excitation may therefore be developed by applying a harmonic electrical potential that creates a frequency response in the cell in which the eight curvilinear segments fold and unfold energetically to perform work on the fluid captured within the eight-fold contour boundary. In some implementations, a leaf cell may include 1, 2, 3, 4, 5, 6, 7, 8, 9, or 10 curvilinear segments. The instantaneous acoustic impedance of the fluid within the cell boundary may then detected as a change in the stress field within the piezoelectric spoke members as evidenced, for example, as a change in the electrical current in the leaf cell electrodes and the integrated electrical circuit. The fluid properties may then be characterized, for example, by an instantaneous electrical admittance spectrum where changes in certain parameters of the admittance spectrum (for example, frequency, bandwidth, and shape) form the basis for a fluid identification measurement algorithm.

Electrical admittance is a measure of how easily a circuit or device will allow a current to flow and is defined as admittance Y=1/Z, where Z is the impedance. In reactive (alternating current) circuits, voltage V=IZ, where V and I are the complex scalars in the voltage and current respectively, and Z is the complex impedance. In Cartesian form, impedance is defined as Z=R+jX where the real part of impedance is the resistance R and the imaginary part is the reactance X (the opposition of a circuit element to a change in current or voltage). The mechanical deformation of a conductor (for example, a leaf cell) alters the resistance and reactance of the conductor, and a change in current (for example, phase shift or magnitude) flowing across the conductor may be detected and used to determine complex admittance spectra.

Figure 3A:
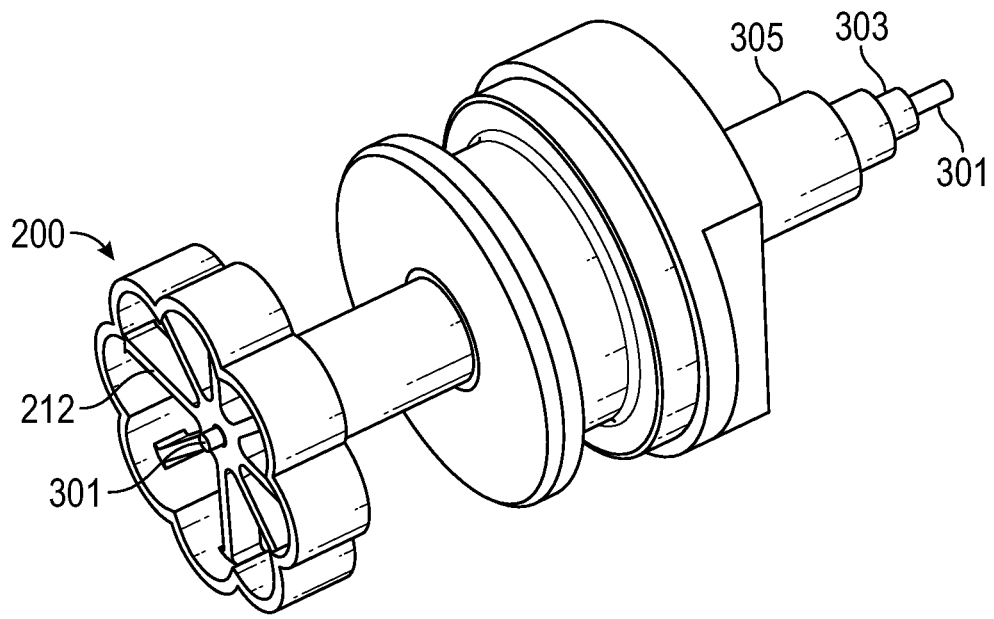
FIGS. 3A and 3B show perspective views of an example leaf cell sensor assembly in accordance with one or more embodiments.
Figure 3B:
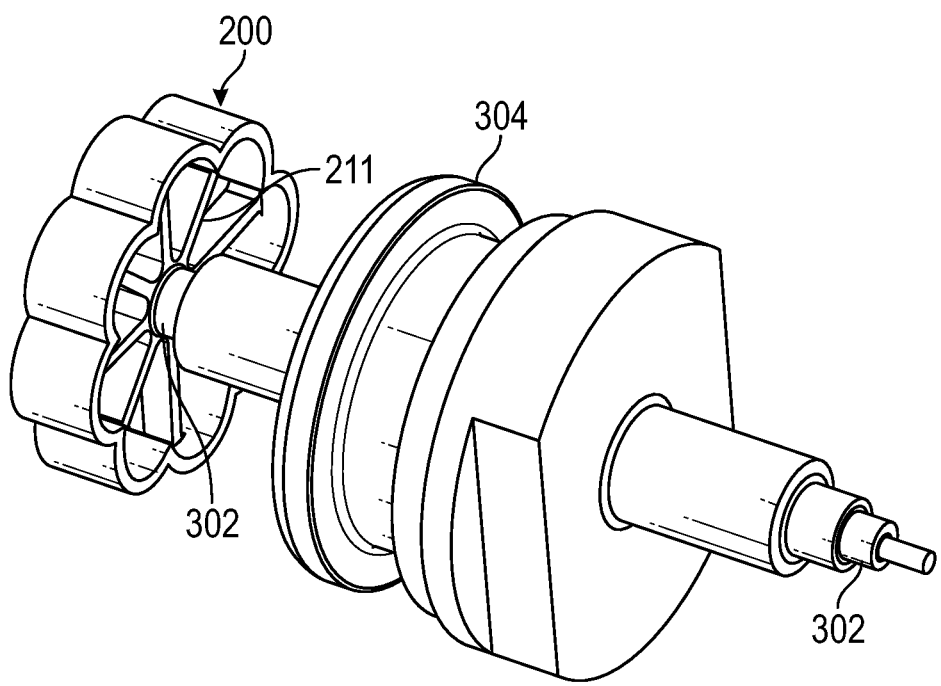
Figure 4C:
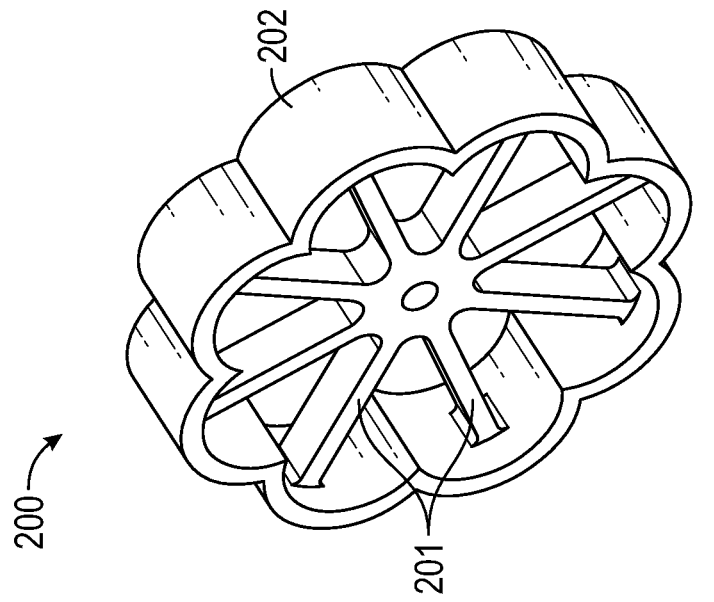
FIGS. 4A, 4B, and 4C show a frontal view, a cut-away side view, and a perspective view of an example leaf cell in accordance with one or more embodiments.
Figure 4B:
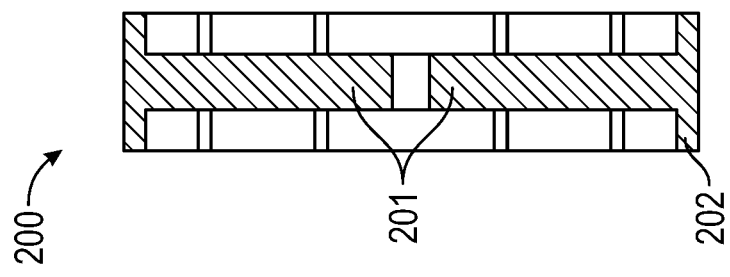
Figure 4A:
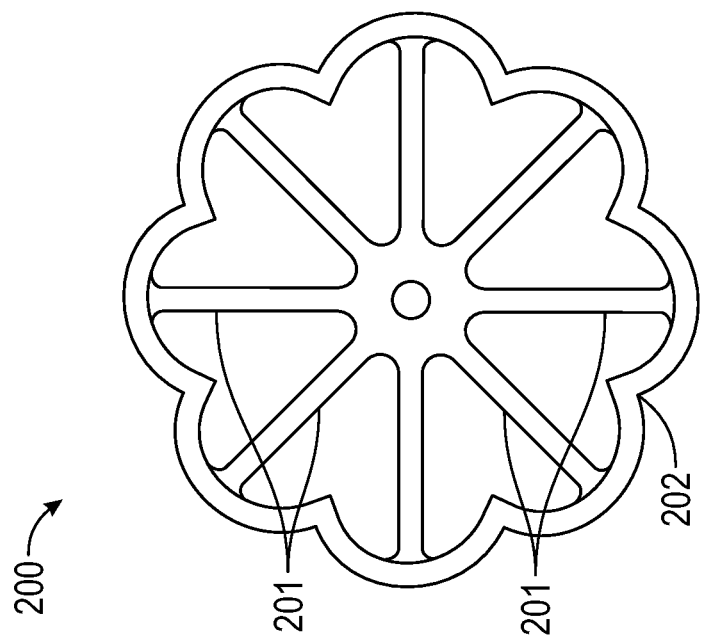

An example leaf cell sensor assembly design is illustrated in FIG. 3A and FIG. 3B. The design concept is based on a coaxial electrical feedthrough approach. An example sensor assembly (300) includes an example leaf cell (200) at a distal end of the assembly. An example leaf cell (200) may include one or more radial components (spokes) and a circumferential component (resonator) having a shape based on contour segments of the canonical Rhodonea conformal mapping geometry defined, for example, by the mathematical relations shown in FIG. 1. A frontal view (A), a cut-away side view (B), and a perspective view (C) of an example leaf cell (200) are shown in FIGS. 4A, 4B, and 4C, respectively. In some implementations, an outer diameter of a resonator is between 100 millimeters and 5 millimeters (mm). In some implementations, an outer diameter of a resonator is between 8 mm and 12 mm. In an example implementation, an outer diameter of a resonator is 10 mm. A leaf cell may include two or more electrodes that may be connected to an inner contact and an outer contact, respectively, for example, of a pressure feedthrough. In some implementation, an electrode may be placed on a spoke of the leaf cell. For example, an inner contact (301) may be connected to an electrode on a distal face (212) of a leaf cell (200), and an outer contact (302) may be connected to an electrode on a proximal face (211) of the leaf cell (200). In some implementations, example pressure feedthrough contacts may include one or more conducting elements that run along a length of a feedthrough assembly. An example inner contact 301 and an example outer contact (302) are otherwise insulated from each other, for example, by an inner insulator (303), such that current flows between the electrodes. Outer contact (302) may be insulated from one or more components (for example, a feedthrough housing (304) of the leaf cell sensor assembly (300) by outer insulator (305). Inner contact (301) and outer contact (302) of the example pressure feedthrough may be connected to a voltage source. In some implementations, an inner contact may be connected to a negative terminal of the voltage source, and an outer contact may be connected to a positive terminal of the voltage source. In some implementations, an inner contact may be connected to a positive terminal of the voltage source, and an outer contact may be connected to a negative terminal of the voltage source. Electrodes and contacts may be connected to a leaf cell such that a voltage can be applied across the thickness of the leaf cell spokes, for example, spokes (201). An inner contact and an outer contact may be connected to an electric current measurement device, for example, an ammeter, to measure current across the thickness of a leaf cell, for example, leaf cell (200).

In some implementations, one or more components of a leaf cell sensor may be adapted to a variety of downhole fluid identification applications including production logging, logging while drilling, and formation sampling and testing. A leaf cell sensor may be implemented as a stand-alone device or may be integrated into one or more downhole tools, for example, production logging or logging while drilling tools.

An example leaf cell sensor operates on the principle that upon excitation of the leaf cell a nearly uniform cylindrical shaped pressure distribution is developed throughout an interior fluid region encompassed by the leaf cell boundary, where the pressure distribution is that of a classical Helmholtz resonator cavity response, but without the reflective walls of a cavity. This aspect of the resonance response is an intent of design for the sensor to interact specifically with the bulk modulus of a fluid medium, and subsequently provide sensitivity to changes in the fluid properties, for example, density and sound speed, from, for example, the compressibility of the fluid. As a result, a unique feature of the leaf cell resonator sensor is that the sensor is capable of retrieving fluid measurements, for example, a density or sound speed measurement, or both, from the fluid independent of the method of deployment, as there is no need for extraneous boundaries in order to develop the Helmholtz cavity-type response. In effect, the resonance characteristics of the fluid volume are coupled intrinsically to the dynamics of the set of curvilinear Rhodonea contour arcs and spoke members comprising the leaf-type cell piezoelectric structure, for example, through the dynamic compressibility of the fluid.

Multiphase streams are typical of the oil and gas fields since the producing wells normally generate a mixture of liquid and gaseous hydrocarbons with a variable quantity of water. Knowing single rates of gas liquid and water is crucial for the production industry in order to monitor the reservoir, to improve the well performances and to optimize the production. Multiphase flow meters (MPFM) are devices used to measure the individual oil, water and gas flow rates in a multiphase flow.

Figure 5A:
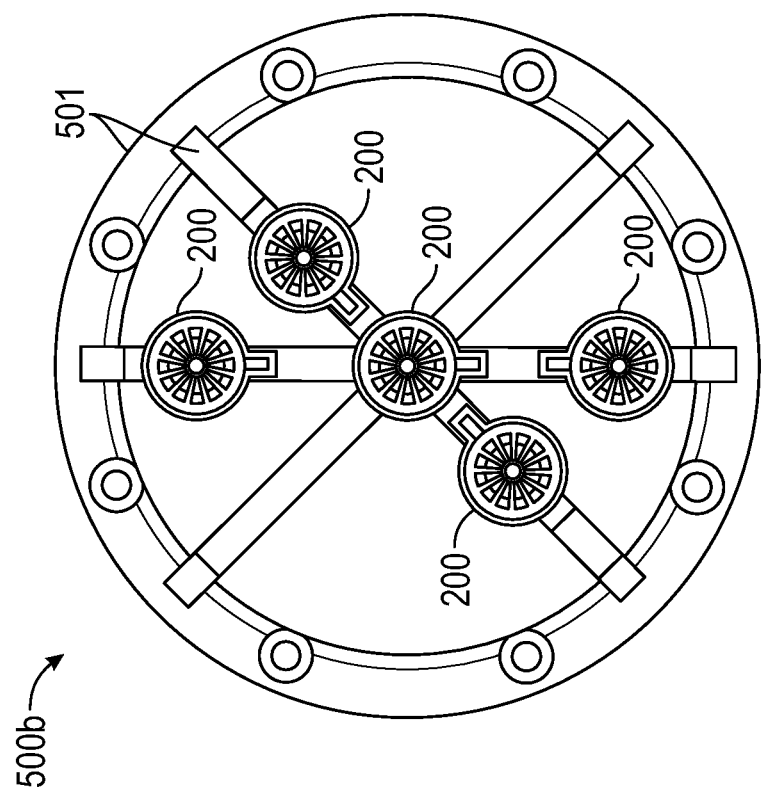
FIGS. 5A and 5B show an example sensor array and an example a multiphase flow meter (MPFM) in accordance with one or more embodiments.
Figure 5A:
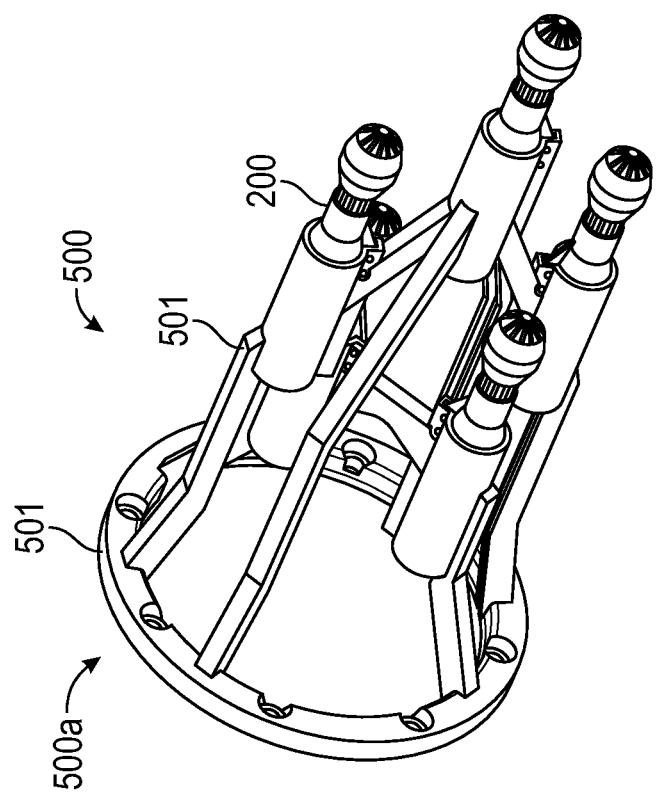
Figure 5B:
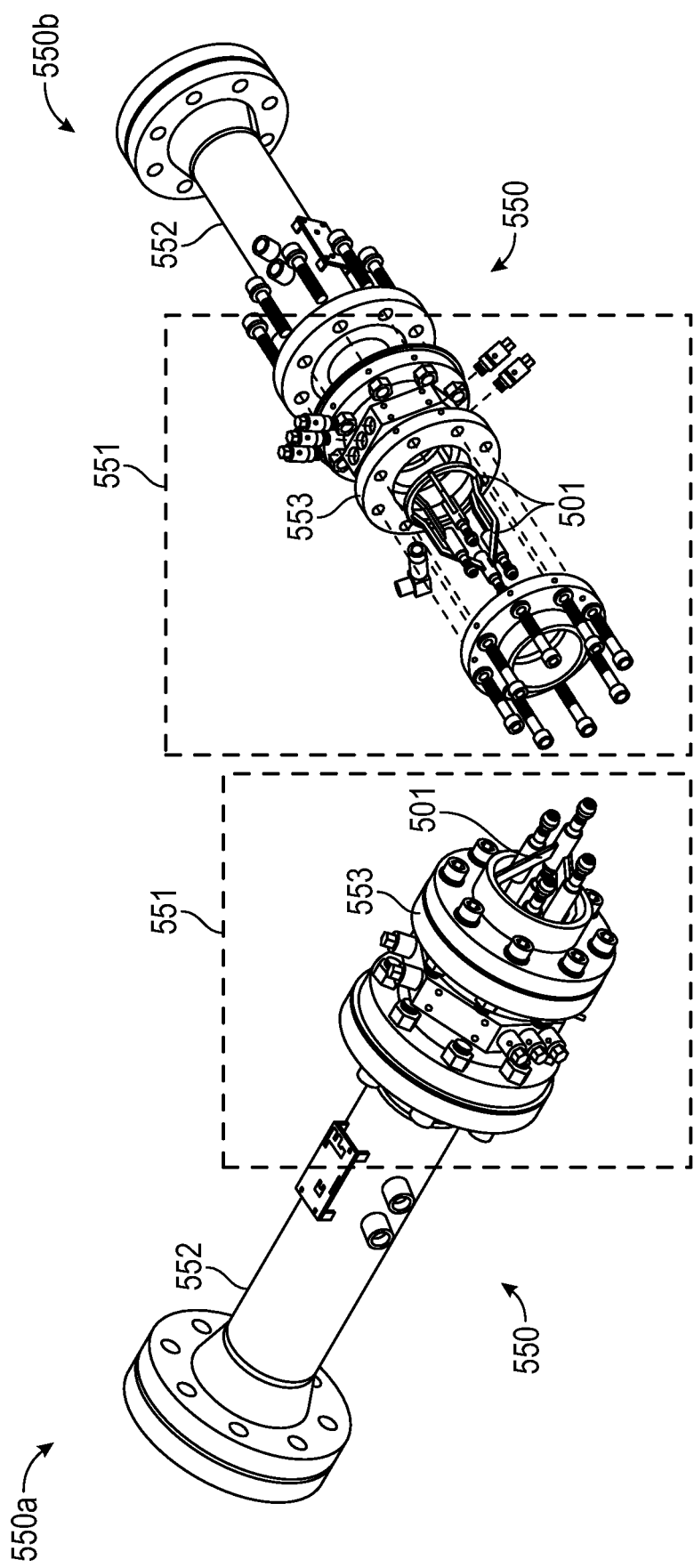

As shown in perspective view (500a) and cross sectional view (500b) of FIG. 5A, a sensor array assembly (500) based on five of the leaf cell resonator (200) is integrated via a frame (501) into an array configuration for a 4" diameter horizontal oriented production pipe that will allow mapping of the flow stream fluid properties over the cross section of the production pipe. The sensor array assembly (500) of FIG. 5A is embedded into an I/O manifold housing (551) as shown in perspective view (550a) and exploded view (550b) of FIG. 5B to form a multiphase flow meter (MPFM) (550). A commercial V-Cone venturi (552) is coupled with the sensor array manifold (553) and provides a differential pressure measurement created by the fluid flow stream velocity. The venturi differential pressure measurement is combined with the fluid density measurements of the sensor array assembly (501) to provide a measurement of the flow stream velocity distribution throughout the pipe cross-section. Integrated in the sensor array manifold (553) are transducers for absolute pressure measurement and fluid temperature measurement. The sensor array assembly (500) may be integrated into a production logging tool or a logging while drilling tool.

Figure 6A:
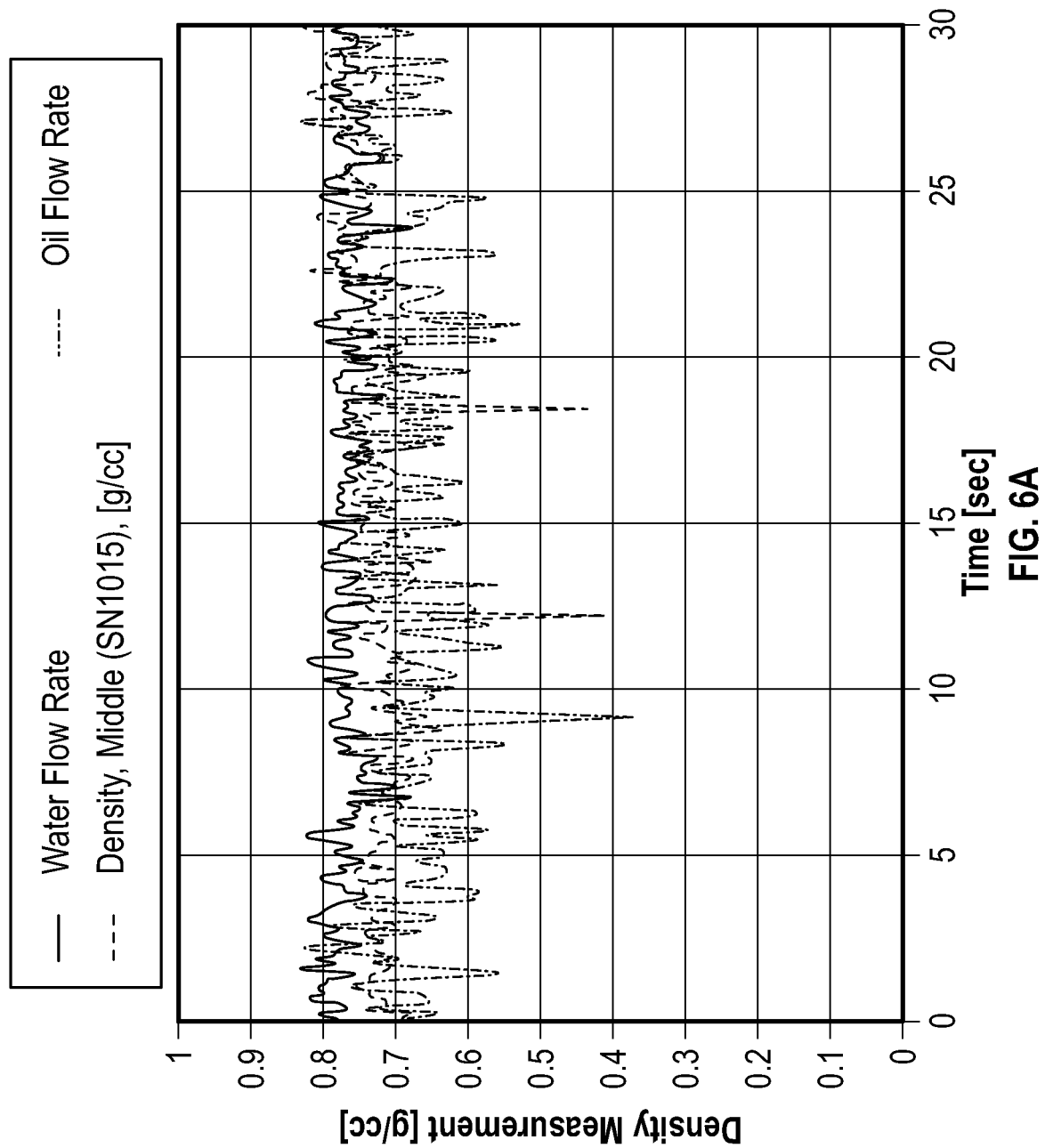
FIGS. 6A, 6B, 6C, and 6D show example sensor array flow loop test results in accordance with one or more embodiments.
Figure 6B:
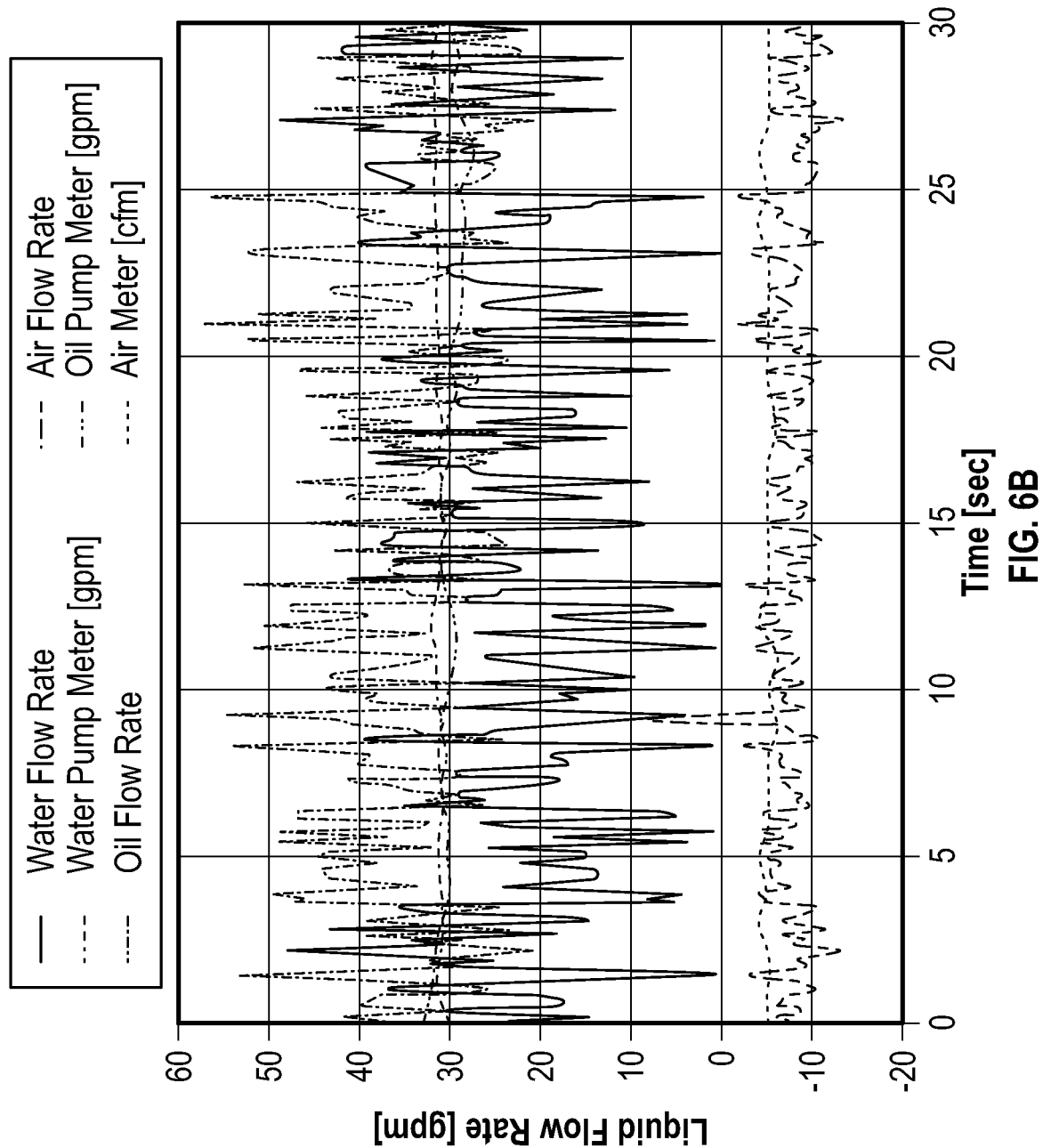
Figure 6C:
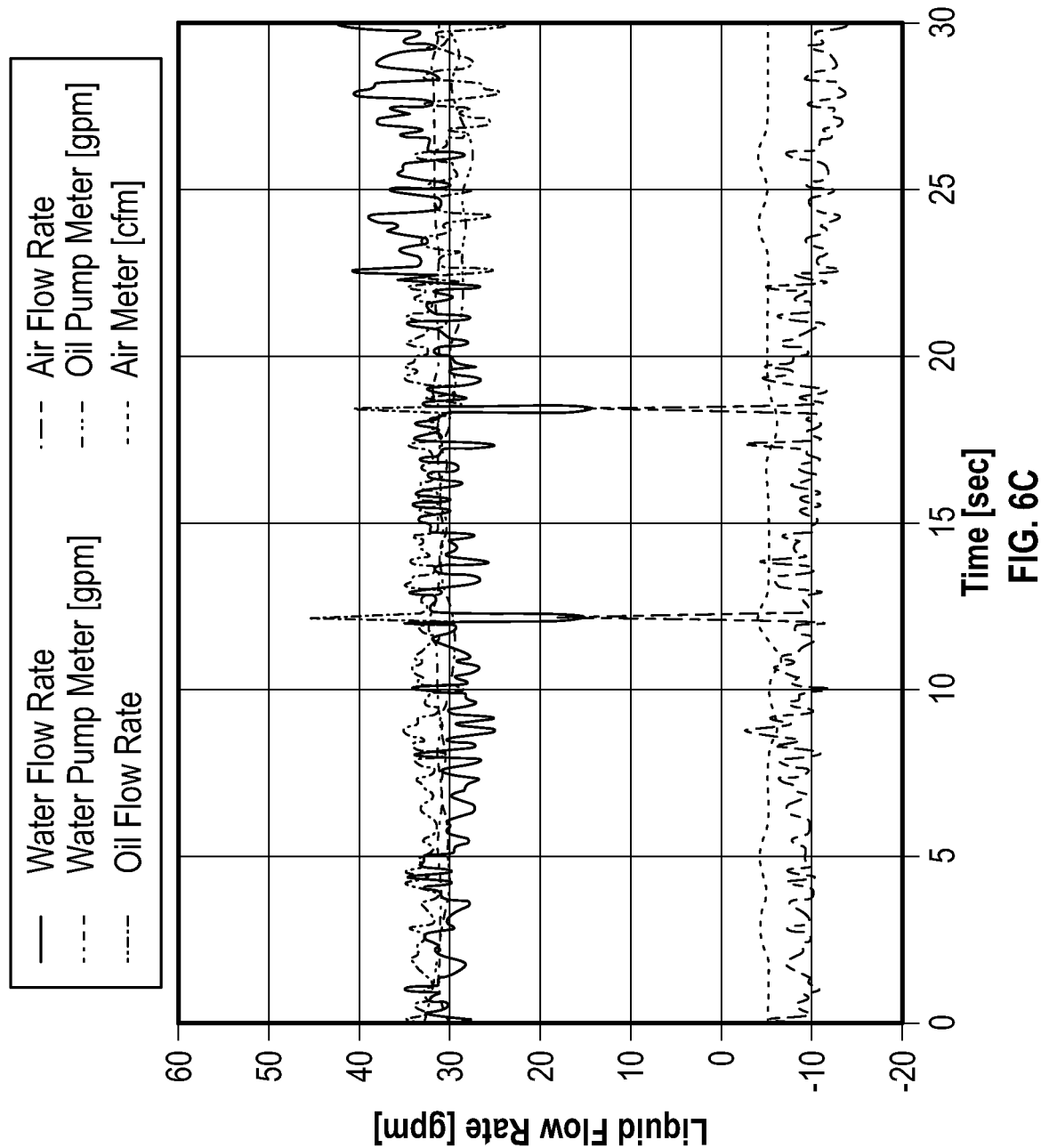
Figure 6D:
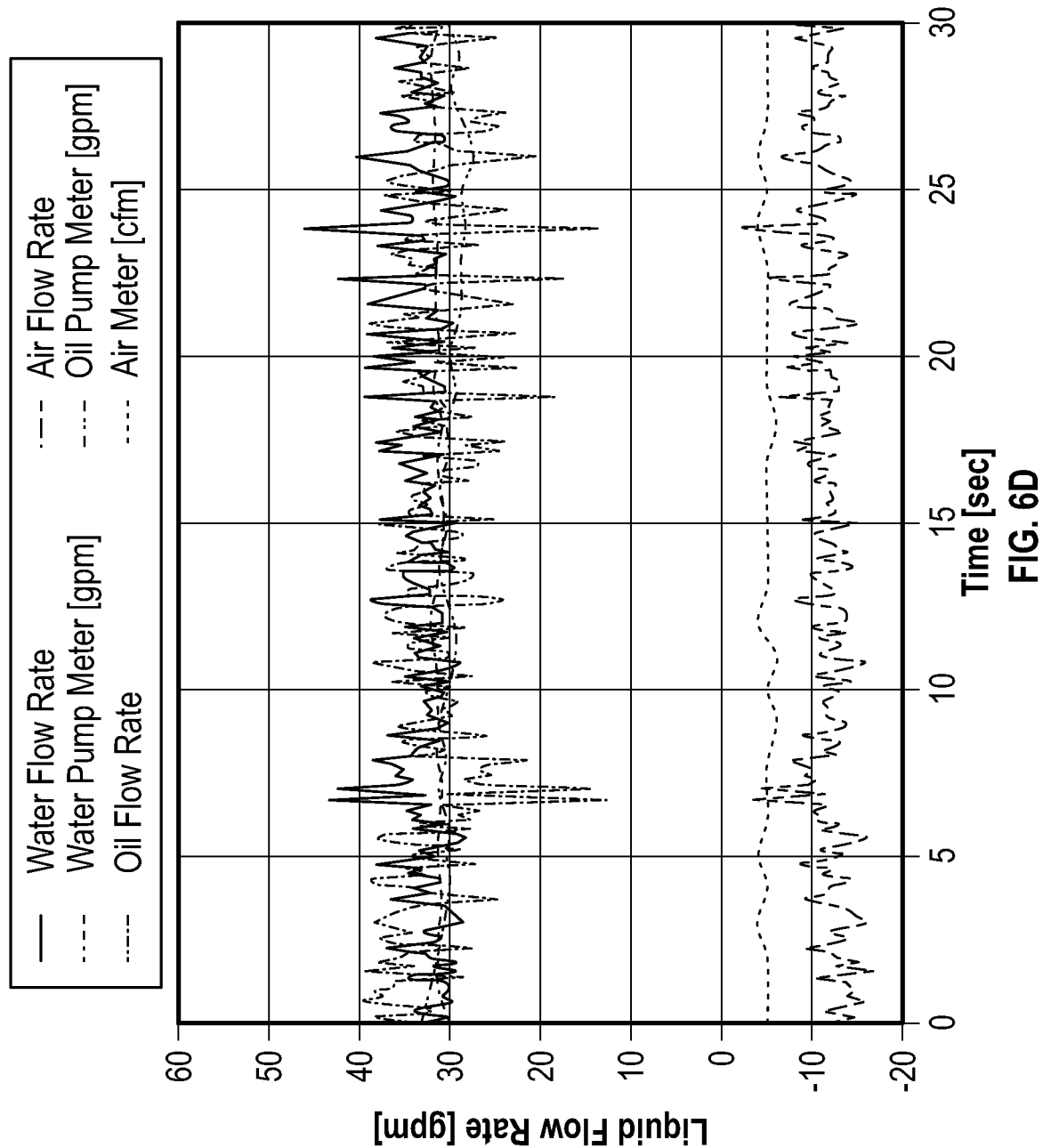

A fundamental limitation in the implementation of the MPFM (550) is that the implemented measurement method relies upon commercial impedance spectroscopy electronics (e.g., an AD5933 impedance measurement integrated circuit from Analog Devices Inc.) based upon the single sine technique (SST) harmonic excitation of the piezoelectric leaf cell resonators in the array. In this method, multiple cycles of harmonic excitation are applied to the resonator at a single frequency and the admittance of the resonator is measured at this single frequency. To obtain the spectral measurement for admittance, the single frequency excitation and measurement is repeated across a frequency range of interest. The measurement time (i.e., speed) to obtain the spectrum is a function of the number of frequency steps and the number of harmonic cycles in the measurement. Accordingly, such an approach has a trade off between resolution and accuracy of the measured spectrum against speed of the spectral measurement. This technique has limited the fluid sample measurement rate to less than 7 Hz for a prototype 3-sensor array (TOP, MIDDLE, and BOTTOM sensors) configuration, under a coarse spectral resolution of 300 Hz frequency step. Example transient measurements of a three sensor leaf cell array similar to the MPFM (550) are shown in FIGS. 6A-6D. Specifically, FIG. 6A shows flow loop test result for bulk fluid density measurements, FIGS. 6B, 6C, and 6D show flow rates measured at the TOP sensor, MIDDLE sensor, and BOTTOM sensor, respectively. In particular, the example measurements shown in FIGS. 6A-6D are acquired at the 7 Hz sample rate at a 50/50 oil/water liquid composition with 2.5 cfm of gas and a moderate liquid flow rate of 2400 bpd.

For the conceptual field ready 5-sensor array configuration, e.g., MPFM (550), the sample measurement rate is expected to deteriorate to less than 3 Hz using this SST approach with the commercial electronics. These current sample rates are expected to omit detection of much of the three phase flow transients that occur at the flow rates expected in actual field application. A sample rate greater than 100 Hz would enhance the capability of the sensor array to accurately detect and measure these distributions of three phase fluid properties through the production pipe cross section.

FIGS. 7A-7D and 8 illustrate a system and a method based upon excitation of the piezoelectric resonator using bandwidth limited white noise to more rapidly acquire spectral data for the resonator admittance. The approach is expected to provide approximately 3 times improvement in spectral resolution and a data acquisition rate in excess of 150 Hz compared to the estimated rate less than 3 Hz based on the SST approach described above.

Figure 7A:
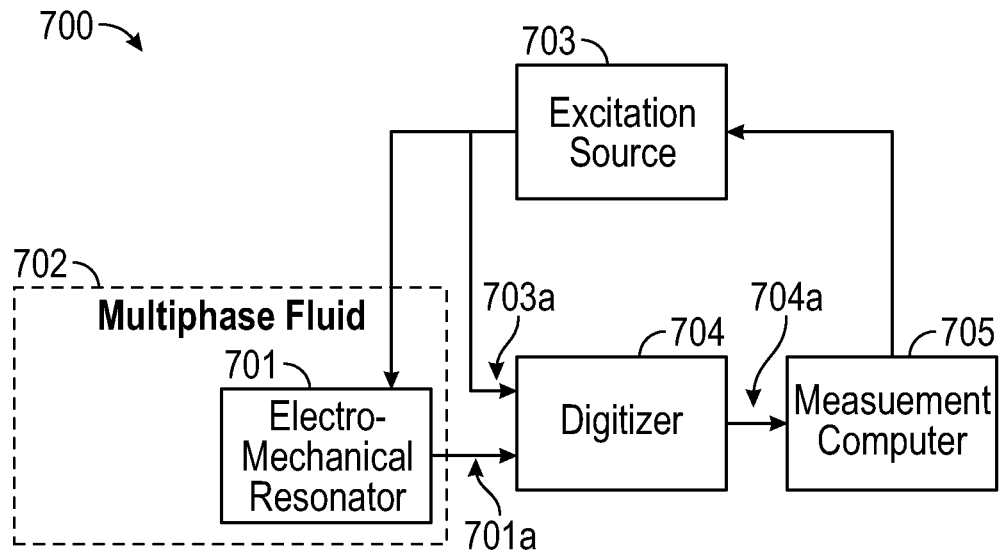
FIGS. 7A, 7B, 7C, and 7D show an example electromechanical resonator system in accordance with one or more embodiments.

FIG. 7A shows a block diagram of an electromechanical resonator system (700) for measuring physical properties of fluids (such as density, viscosity, etc.). As shown in FIG. 7A, the resonator system (700) includes an electromechanical resonator (701), an excitation source (703), a digitizer (704), and a measurement computer (705). In one or more embodiments, the electromechanical resonator (701) includes the leaf cell resonator (200) described above. Accordingly, the resonator system (700) has a frequency dependent response that is sensitive to the physical properties of the fluids (702), such as wellbore fluids in which the resonator (701) is immersed. For example, the resonant frequency of the electromechanical resonator (701) is modified by the density of the fluid (702) surrounding the resonator (701), the bandwidth of the electromechanical resonator's resonant frequency is modified by the viscosity of the fluid (702) surrounding the resonator (701), etc. In order to accurately measure the content of flowing multiphase fluid mixtures (702) in which the sensor (701) is immersed, it is necessary for the resonator system (700) to interrogate the frequency dependent response of the electromechanical resonator (701) as rapidly as possible.

As shown in FIG. 7A, an excitation source (703) is a circuit that couples electrical energy into the electromechanical resonator (701) at multiple frequencies concurrently. More specifically, the electrical energy is coupled concurrently with multiple frequencies to piezoelectric radial components (e.g., in the leaf cell sensor (200) depicted in FIGS. 3A-3B, 4A-4C, and 5A-5B above) of the electromechanical resonator. For example, the excitation source (703) may be a voltage source. The spectral power density of the excitation source (703) may be white gaussian noise with energy content according to a gaussian or normal distribution or a band-limited spectral power density with energy concentrated at a particular range of frequencies (e.g., the range of 55-75 kHz with uniform energy content).

A digitizer (704) is an analog-to-digital converter circuit that records the transmitted energy (703a) of the excitation source (703) and the energy response (701a) of the electromechanical resonator (701) simultaneously. For example, the digitizer (704) may include an electrical voltage measurement device and an electrical current measurement device that record the transmitted energy (703a) and the energy response (701a) as voltage measurements and current measurements, respectively. Specifically, the digitizer (704) converts measured analog signals of the transmitted energy (703a) and the energy response (701a) into digital time-series data (704a).

A measurement computer (705) converts the digital time-series data (704a) derived from the excitation source (703) and the electromechanical resonator (701) into frequency domain response, normalizes the electromechanical resonator frequency response by the excitation source frequency response, and derives physical properties of the fluid (702) based on the normalized frequency response. The excitation source (703) may operate in pulsed mode, where the measurement computer (705) triggers the source pulses, or in continuous mode where the excitation source (703) continuously couples energy into the electromechanical resonator (701). In one or more embodiments, the measurement computer (705) includes a processor of a computing device and a non-transitory computer readable medium storing instructions thereon, where the instructions, when executed, cause the processor to determine, from the measured digital time-series data (704a), one or more physical properties of the fluid (702).

Figure 7B:
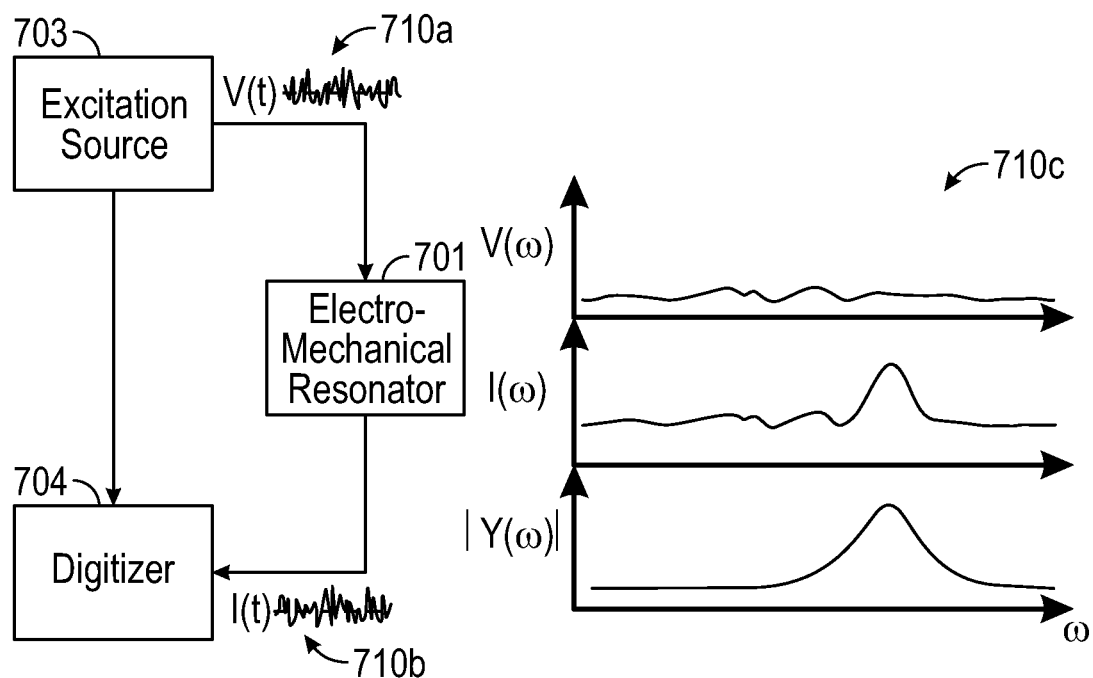

FIG. 7B illustrates the embodiments where the excitation source is a white noise generator. Gaussian white noise has a power spectral density with equal energy content at all frequencies. As shown in FIG. 7B, the excitation source voltage time-series V(t) may issue white noise voltage (710a) in short pulses (e.g., 10 ms or less in duration, repeated at 100 Hz or higher frequency), or continuously. Throughout this disclosure, the term "time-series" may refer to digital time-series data or analog waveform depending on the context. The electromechanical resonator response to this excitation source issued white noise voltage (710a) is a current time-series I(t) (710b), which is affected by the intrinsic admittance spectra of the electromechanical resonator (701) and the fluid (702) in which it is immersed. The noise voltage (710a) and the current time-series I(t) (710b) correspond to the transmitted energy (703a) of the excitation source (703) and the energy response (701a) of the electromechanical resonator (701) depicted in FIG. 7A above. Features in this admittance spectra, such as the resonant frequency and bandwidth of the electromechanical resonator (701) are then related to the physical properties of the fluid (702) being measured.

In one or more embodiments, the electromechanical resonator system (700) may be integrated into a production logging tool or a logging while drilling tool.

Figure 8:
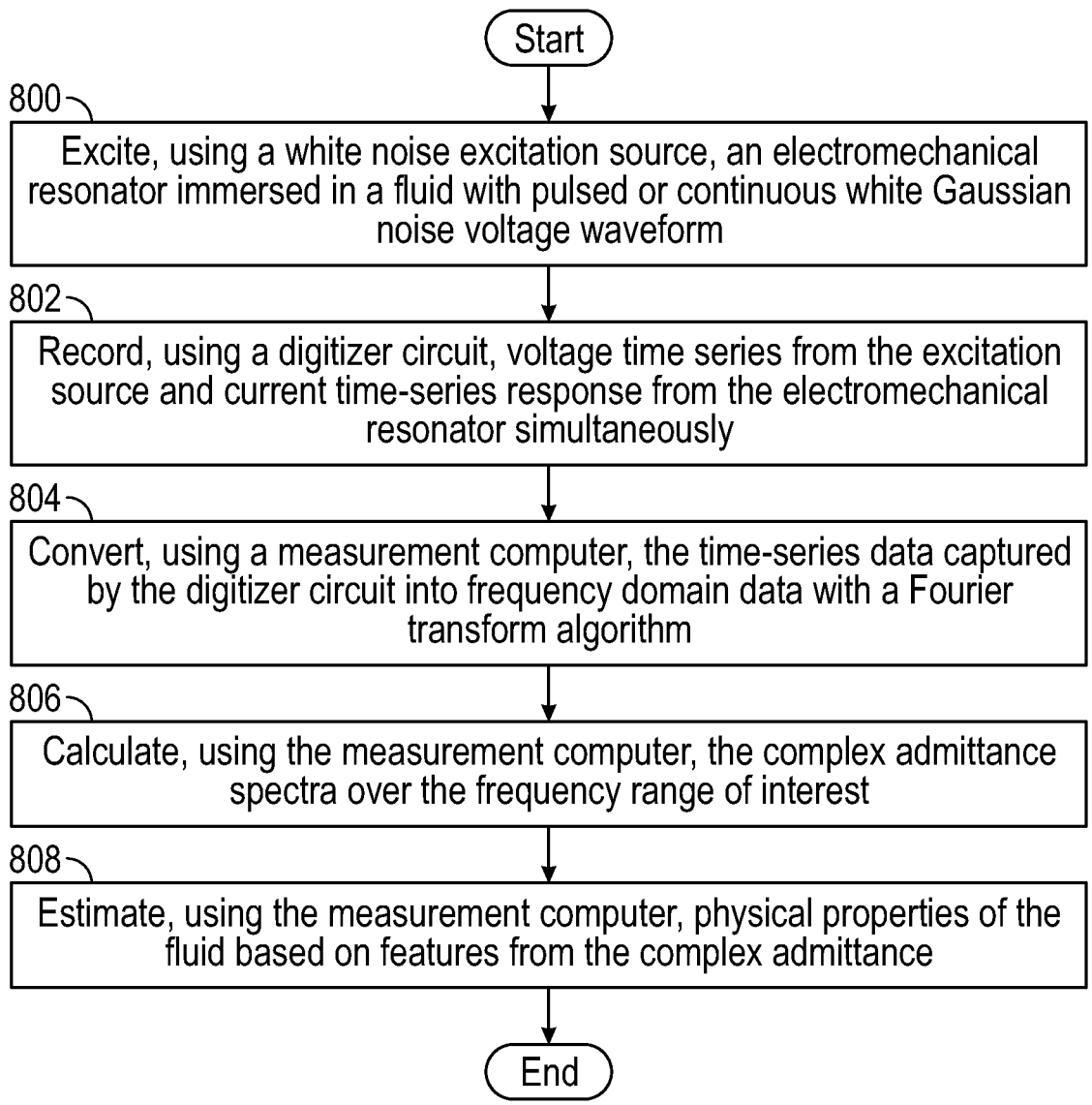
FIG. 8 shows a flowchart in accordance with one or more embodiments.

The measurement method is illustrated in FIG. 8. Specifically, FIG. 8 shows a flowchart in accordance with one or more embodiments disclosed herein. One or more of the steps in FIG. 8 may be performed by the components of the resonator system (700), discussed above in reference to FIGS. 7A-7B. In one or more embodiments, one or more of the steps shown in FIG. 8 may be omitted, repeated, and/or performed in a different order than the order shown in FIG. 8. Accordingly, the scope of the disclosure should not be considered limited to the specific arrangement of steps shown in FIG. 8.

The measurement method illustrated in FIG. 8 may be performed using an example leaf cell resonator sensor based on a geometry of Rhodonea conformal contours joined circumferentially in an eight-fold symmetry by central spoke electrode members. An example leaf cell resonator sensor may utilize a self-formed Helmholtz acoustic cavity response of fluid circumferentially enclosed by the leaf cell resonator boundary. A leaf cell resonator sensor may provide simultaneous and congruent measurement of fluid density and sound speed based on interaction of the leaf cell dynamics with self-formed Helmholtz cavity dilatational response of the fluid, and the associated changes in electrical admittance spectra in the sensor resulting from changes in fluid acoustic properties. A leaf cell resonator sensor may be capable of retrieving a density and sound speed measurement from fluid independent of the method of deployment, resulting from the principle of the self-formed Helmholtz resonant cavity feature that develops a standing acoustic wave pattern in the fluid without extraneous reflecting structure/hardware.

The measurement method illustrated in FIG. 8 may be performed using an example apparatus for fluid measurement that includes a leaf cell having one or more piezoelectric radial components connected to a circumferential component. The one or more radial components and the circumferential component have a distal face and a proximal face. The example apparatus includes a first electrode positioned on the distal face of at least one radial component. The example apparatus includes a second electrode positioned on the proximal face of the at least one radial component. The example apparatus includes a voltage source having a negative terminal and a positive terminal, the negative terminal being connected to the first electrode and the positive terminal being connected to the second electrode. The circumferential component may have a shape based on contour segments of the canonical Rhodonea conformal mapping geometry. The example apparatus may include an electric current measurement device connected to the first and second electrode to measure current flowing between the first and second electrode. The example apparatus may include a processor of a computing device and a non-transitory computer readable medium storing instructions thereon, wherein the instructions, when executed, cause the processor to determine, from the measured current, one or more properties of the fluid. The one or more properties of the fluid may include fluid density or fluid sound speed. Determining may include determining electrical admittance spectra.

The measurement method illustrated in FIG. 8 for measuring one or more properties of a fluid includes immersing the apparatus described above into a volume of the fluid, where the apparatus includes a leaf cell having one or more piezoelectric radial components connected to a circumferential component. The example method includes applying an excitation voltage across a first electrode and a second electrode, thereby inducing a strain in the piezoelectric radial component. The example method includes measuring a current flowing between the first electrode and the second electrode. The example method includes determining, from the current, the one or more fluid properties of the fluid. The one or more properties of the fluid may include fluid density or fluid sound speed. The determining step may include determining electrical admittance spectra. The example method may include one or more reference measurements in air.

Initially in Step 800, the excitation source (703) excites the electromechanical resonator (701) with pulsed or continuous white gaussian noise voltage time-series V(t) (710a).

In Step 802, the digitizer (704) records the voltage time series V(t) (710a) and the current time-series I(t) response (710b) from the electromechanical resonator (701) simultaneously.

In Step 804, the measurement computer (705) converts the time-series data (704a) captured by the digitizer (704) into frequency domain data with a Fourier transform algorithm, e.g., an FFT, such that:

V(t)→V(ω) and I(t)→I(ω) where ω is the angular frequency in rad/s, as shown in the frequency domain plot (710c).

In Step 806, the measurement computer (705) calculates the complex admittance spectra over the frequency range of interest, such that:

$$Y(\omega) = \frac{I(\omega)}{V(\omega)}$$

as shown in the frequency domain plot (710c).

In Step 808, the measurement computer (705) estimates physical properties (e.g., density, sonic speed, etc.) of the fluid (702) based on features from the complex admittance, e.g., the change in resonant frequency and bandwidth of the electromechanical resonator's bandwidth within the frequency region of interest. For example, the resonant frequency of 64 kHz may correspond to a density of 0.88 g/cc and sound speed of 1350 m/sec. The bandwidth may range between 3 kHz for pure water to more than 5 kHz for an emulsified oil-water-gas flow. Additional features from the complex admittance may also be used to estimate the physical properties, the additional features including a peak shift in a real part of complex admittance between air and fluid, a change in bandwidth between air and fluid, a valley shift in the imaginary part of admittance between air and fluid, and a valley shift in admittance magnitude between air and fluid.

For example, the fluid density (rho) may be determined at least in part based on the equation rho=$\alpha_1$(DR−DPHBW)+$\alpha_2$(DI2−DPHBW)+$\alpha_3\sqrt{DM2}$ where DR denotes a peak shift in a real part of complex admittance between air and fluid, DPHBW denotes change in bandwidth between air and fluid, DI2 denotes the valley shift in the imaginary part of admittance between air and fluid, and DM2 denotes the valley shift in admittance magnitude between air and fluid. The fluid sound speed (ss) may be determined at least in part based on the equation SS=$\alpha_1$DPH+$\alpha_2$(DR−DPHBW)+$\alpha_3\sqrt{DI2-DPHBW}$ where DPH denotes a difference in phase peak of admittance between air and fluid, DR denotes a peak shift in the real part of admittance between air and fluid. DPHBW denotes change in bandwidth between air and fluid, and DI2 denotes the valley shift in the imaginary part of admittance between air and fluid.

Figure 7C:
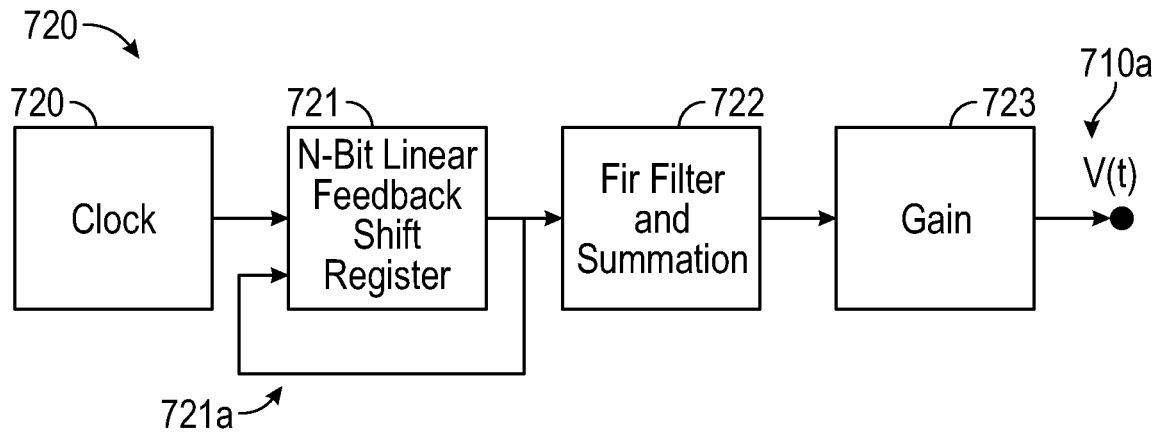

Returning to the discussion of the electromechanical resonator system, FIG. 7C shows a block diagram of an example analog white noise excitation source (720). For example, the excitation source (703) depicted in FIG. 7B above may include the analog white noise excitation source (720). In another example, the excitation source (703) depicted in FIG. 7B above may include a digital white noise excitation source. In the case of analog implementation, the white gaussian noise voltage excitation source (720) is provided by a filtered linear feedback shift register (LFSR) (721). The LFSR (721) is composed of an N-bit shift register, with feedback of certain bits (721a) into the input of the shift register to create a pseudorandom noise pattern. Each bit of the LFSR (721) is proportionally summed in parallel to create an analog FIR filter (722). The summing operation creates a white gaussian noise profile, and the FIR filter (722) creates a passband where the evenly distributed energy of certain frequency ranges has gain applied and interrogates the electromechanical resonator (701). The clock (720) controls the rate at which the bit sequence in the LFSR (721) advances, e.g., the maximum frequency of the white noise voltage time-series (710a). In the case of digital implementation, a microprocessor contains functions which mimic the analog LFSR (721), FIR filter and summation (722). The result is then output on a digital to analog converter to provide the excitation source.

The enhanced measurement speed of the measurement system and method above compared to traditional admittance spectroscopy methods is due to the nature of the excitation source frequency content. In this method, a continuum of frequencies with some energy content interrogate the electromechanical resonator (701) concurrently, rather than a single point-by-point frequency sweep method. The speed of this method does impose compromises in the quality of the measurement, such as frequency resolution, bandwidth of the white gaussian noise voltage generated by the excitation source, and signal to noise ratio (SNR) of the fluid property measurements derived from the admittance spectra.

The length of the time-series V(t) and I(t) processed by the measurement computer (705) and the speed at which the digitizer (704) samples the time-series data (704a) controls the resolution of the frequency space that is measured:

$$\Delta \omega = \frac{\omega_s}{N_s}$$

where $\Delta \omega$ is the resolution of the frequency domain transform in rad/s, $\omega_s$ is the sampling rate of the digitizer in rad/s, and $N_s$ is the number of samples of time-series V(t) and I(t) processed by the measurement computer (705). The frequency resolution is inversely proportional to the number of time-series samples acquired by the system, e.g., faster measurement speed is possible with less samples but the frequency resolution decreases which may result in less accurate fluid property measurements.

The clock rate at which the pseudorandom white noise generator (720) is operating and the frequency location of the FIR filter passband control the bandwidth of the white gaussian noise voltage (710a) containing equally distributed energy in which to interrogate the electromechanical resonator (701). The bandwidth of electromechanical resonator response over the range of fluid property is more complex, or spurious frequency responses are to be rejected, then the complexity of the FIR filter (and therefore the number of taps in the system) is to be increased to provide for this complex filter bandwidth. As the complexity of the FIR filter increases, the delay at which measurements are acquired increases.

The SNR of the fluid property measurements is affected by the amplitude of the excitation source, the bandwidth of the relevant admittance measurement, and the frequency resolution Aw. If the desired measurement accuracy is not achievable in a single measurement instance, then multiple measurements may be averaged together to increase the SNR of the fluid properties of interest. However, the fluid properties may change sufficiently over time such that a bias is introduced into consecutive measurements of the fluid and accuracy may decrease as a result.

Figure 7D:
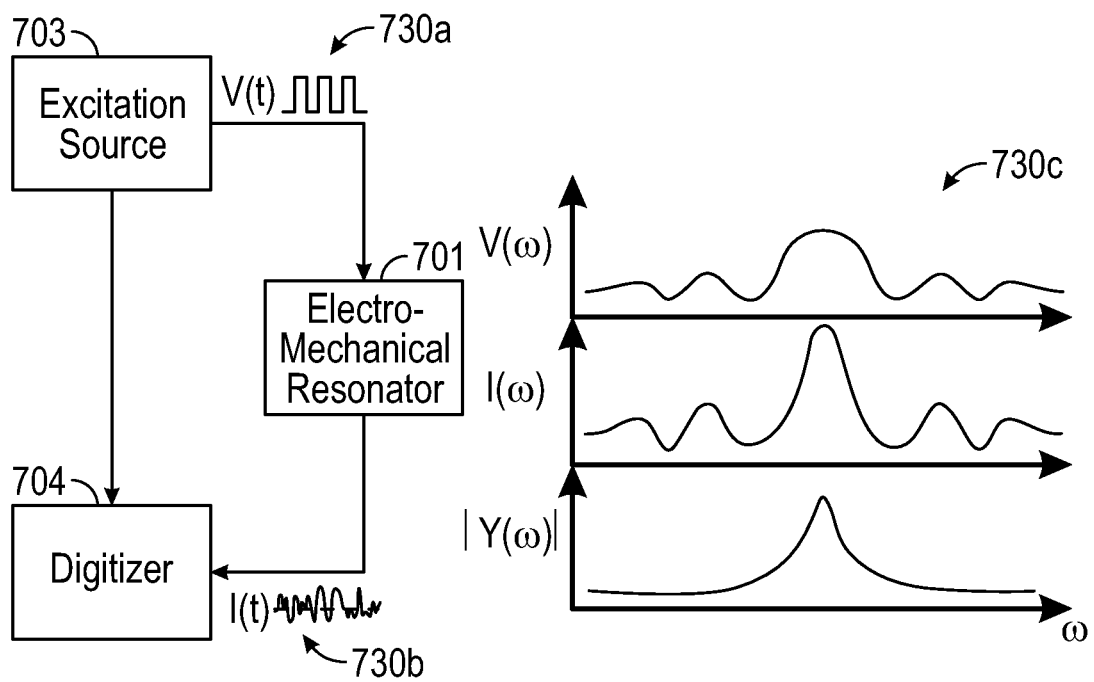

FIG. 7D illustrates the embodiments where the excitation source (703) produces a square wave pulse train (730a) with a fixed number of periods and a fixed repetition rate. For example, the repetition rates may be near the resonant frequency of the sensing device in the range of fluids to be evaluated, e.g. 65 kHz for a sensor that resonates anywhere from 60-70 kHz in the fluids to be evaluated. The bandwidth of the primary mode is inversely proportional to the number of successive periods of square waves issued at the fixed repetition rate. In some embodiments, the number of periods and repetition rate of the square wave pulse train are selected such that the bandwidth and center frequency focus energy within the expected frequency range of the measurement. For example, the 65 kHz repetition rate square wave pulse train with 5 periods of repetition would have bandwidth from ~59-71 kHz.

As shown in FIG. 7D, the square wave pulse train voltage time-series V(t) takes the shape of a sinc-function in frequency domain, shown as V(ω) in the frequency domain plot (730c) wherein energy is localized to a certain range of frequencies. The center frequency is controlled by the repetition rate of the square wave pulse train (730a), and the bandwidth is controlled by the number of periods of this square wave pulse train (730a) that are output by the excitation source (703). In this embodiment, the excitation source (703) may simply by a single digital output driving the excitation between two states, e.g., a half-bridge driver circuit controlled by the measurement computer (705).

The measurement method is substantially the same as in the previous embodiment described in reference to FIG. 8. There are two key differences:

The excitation voltage time-series (730a) may have pre-determined parameters (e.g., amplitude, period, repetition rate, amplitude, rise/fall time, etc.) due to the fixed nature of the excitation pattern, and therefore the digitizer (704) may only need to sample the current time-series response of the electromechanical resonator (701). The pre-determined parameters of the voltage time series (730a) are then used for subsequent admittance spectra calculations.

The power spectral density of the excitation source (703) is localized to the bandwidth of interest (e.g., 55-75 kHz) of the electromechanical resonator (701) through careful choice of the repetition rate and number of periods of the square wave pulse train (730a). In this manner, energy is concentrated into a certain frequency range and less energy content is 'lost' at frequencies outside the bandwidth of interest.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed:

1. An apparatus for fluid measurement, the apparatus comprising:
    a leaf cell sensor having one or more piezoelectric radial components connected to a circumferential component, the one or more radial components and the circumferential component having a distal face and a proximal face;
    a first electrode positioned on the distal face of at least one radial component;
    a second electrode positioned on the proximal face of the at least one radial component;
    a voltage source having a negative terminal and a positive terminal, the negative terminal being connected to the first electrode and the positive terminal being connected to the second electrode;
    an electric current measurement device connected to the first and second electrode to measure current flowing between the first and second electrode; and
    a processor of a computing device and a non-transitory computer readable medium storing instructions thereon, wherein the instructions, when executed, cause the processor to determine, from the measured current, one or more properties of the fluid, wherein the voltage source couples electrical energy into the one or more piezoelectric radial components at multiple frequencies concurrently, and wherein the voltage source comprises a white noise generator having a spectral power density of white gaussian noise with energy content according to a gaussian distribution.

2. The apparatus of claim 1, wherein the white noise generator has a band-limited spectral power density with energy content concentrated at a particular range of frequencies.

3. The apparatus of claim 1, where the circumferential component has a shape based on contour segments of the canonical Rhodonea conformal mapping geometry.

4. The apparatus of claim 1, wherein determining comprises determining electrical admittance spectra.

5. The apparatus of claim 4, the one or more properties of the fluid comprising fluid density, wherein fluid density (rho) is determined at least in part based on the equation $$rho = \alpha_1(DR - DPHBW) + \alpha_2(DI2 - DPHBW) + \alpha_3\sqrt{DM2}$$

where DR denotes a peak shift in a real part of complex admittance between air and fluid, DPHBW denotes change in bandwidth between air and fluid, DI2 denotes the valley shift in the imaginary part of admittance between air and fluid, DM2 denotes the valley shift in admittance magnitude between air and fluid, and α1, α2, α3 denote regression coefficients.

6. The apparatus of claim 5, wherein the one or more properties of the fluid further comprise fluid sound speed.

7. The apparatus of claim 6, wherein fluid sound speed (SS) is determined at least in part based on the equation $$ss = \alpha_1 DPH + \alpha_2(DR - DPHBW) + \alpha_3\sqrt{DI2 - DPHBW}$$

where DPH denotes a difference in phase peak of admittance between air and fluid, DR denotes a peak shift in the real part of admittance between air and fluid, DPHBW denotes change in bandwidth between air and fluid, DI2 denotes the valley shift in the imaginary part of admittance between air and fluid, and α1, α2, α3 denote regression coefficients.

8. The apparatus of claim 1, wherein the leaf cell sensor comprises eight piezoelectric radial components.

9. The apparatus of claim 1, wherein the leaf cell sensor comprises lead zirconate titanate.

10. The apparatus of claim 1, wherein the circumferential component has an outer diameter of between 8 mm and 12 mm.

11. The apparatus of claim 1, wherein the apparatus is integrated into a production logging tool or a logging while drilling tool, wherein the fluid comprises a multiphase wellbore fluid.

12. A method for measuring one or more properties of a fluid, the method comprising:

immersing the apparatus of claim 1 into a volume of the fluid;

applying electrical energy at multiple frequencies concurrently across the first electrode and the second electrode to induce strain in the piezoelectric radial component;

measuring, in response to inducing the strain, a current flowing between the first electrode and the second electrode; and determining, from the current, the one or more properties of the fluid.

13. The method of claim 12, wherein the electrical energy has a band-limited spectral power density with energy content concentrated at a particular range of frequencies.

14. The method of claim 12, wherein determining comprises determining electrical admittance spectra.

15. The method of claim 12, the one or more properties of the fluid comprising fluid density and fluid sound speed, wherein the fluid density (rho) is determined at least in part based on the equation $$rho = \alpha_1(DR - DPHBW) + \alpha_2(DI2 - DPHBW) + \alpha_3\sqrt{DM2}$$

where DR denotes a peak shift in a real part of complex admittance between air and fluid, DPHBW denotes change in bandwidth between air and fluid, DI2 denotes the valley shift in the imaginary part of admittance between air and fluid, DM2 denotes the valley shift in admittance magnitude between air and fluid, and α1, α2, α3 denote regression coefficients, and wherein fluid sound speed (SS) is determined at least in part based on the equation $$ss = \alpha_1 DPH + \alpha_2(DR - DPHBW) + \alpha_3\sqrt{DI2 - DPHBW}$$

where DPH denotes a difference in phase peak of admittance between air and fluid, DR denotes a peak shift in the real part of admittance between air and fluid, DPHBW denotes change in bandwidth between air and fluid, DI2 denotes the valley shift in the imaginary part of admittance between air and fluid, and α1, α2, α3 denote regression coefficients.

16. An apparatus for fluid measurement, the apparatus comprising:

a leaf cell sensor having one or more piezoelectric radial components connected to a circumferential component, the one or more radial components and the circumferential component having a distal face and a proximal face;

a first electrode positioned on the distal face of at least one radial component;

a second electrode positioned on the proximal face of the at least one radial component;

a voltage source having a negative terminal and a positive terminal, the negative terminal being connected to the first electrode and the positive terminal being connected to the second electrode;

an electric current measurement device connected to the first and second electrode to measure current flowing between the first and second electrode; and a processor of a computing device and a non-transitory computer readable medium storing instructions thereon, wherein the instructions, when executed, cause the processor to determine, from the measured current, one or more properties of the fluid, wherein the voltage source couples electrical energy into the one or more piezoelectric radial components at multiple frequencies concurrently, and wherein the voltage source comprises a square wave pulse train.

17. A method for measuring one or more properties of a fluid, the method comprising:
  immersing the apparatus of claim 16 into a volume of the fluid;
  applying electrical energy at multiple frequencies concurrently across the first electrode and the second electrode to induce strain in the piezoelectric radial component;
  measuring, in response to inducing the strain, a current flowing between the first electrode and the second electrode; and
  determining, from the current, the one or more properties of the fluid.

* * * * *